United States Patent Office 3,496,271
Patented Feb. 17, 1970

3,496,271
METHOD OF KILLING COCCIDIA AND ASCARIDAE WORM EGGS
Gottfried Ewald Ferdinand Aloisius Röhner, Froschhausen, near Hanau am Main, Germany
No Drawing. Filed June 26, 1967, Ser. No. 649,000
Claims priority, application Germany, July 1, 1966, R 43,621
Int. Cl. A01n 9/30, 9/34, 9/26
U.S. Cl. 424—213      5 Claims

ABSTRACT OF THE DISCLOSURE

This invention relates to methods of killing organisms which are protected by lipid-containing shells such as Coccidia in oocyst form and Ascaridae worm eggs.

---

Killing organisms which have solid protective shells by disinfectants is generally made difficult because the disinfectants used cannot penetrate into the inside of the organisms. This applies particularly in the case of Coccidia in occyst form and Ascaridae worm eggs, which are excellently protected from all disinfectants by a lipoid-containing keratin shell. Coccidia, which are the cause of coccidiosis, are protozoa and parasites which occur in all types of poultry and birds and in many small animals, particularly rabbits.

Experiments hitherto have produced a disinfectant which contains as base a high proportion of carbon disulphide, to which suitable germicides are added. Using these disinfectants, coccidia and worm eggs could be destroyed in that the protective shell was dissolved by the carbon disulphide and the biocidic substances or germicides could then penetrate into the inside. It is stated in the literature that when disinfecting poultry runs or apparatus Coccidia oocysts and worm eggs can only be destroyed if disinfectants are used which contain carbon disulphide.

However, the use of carbon disulphide results in considerable disadvantages because even in small concentration it causes serious damage to the health. In addition, it is exceedingly inflammable and there is a danger of the formation of explosive mixtures with air.

The problem underlying the invention is therefore to replace the toxic and inflammable carbon disulphide by other substances which penetrate the protective shell of the Coccidia oocysts and worm eggs in the same manner as carbon disulphide and thus meet the requirement for killing these pathogenic agents, but which on the other hand are not toxic or inflammable.

It has been surprisingly found that low chlorohydrocarbons, especially methylene chloride (for example also mixed with tricholorethylene and trichloroethane), meet the requirements made of a disinfectant which is to be effective against Coccidia oocysts and worm eggs.

Methylene chloride may be used alone. If it is brought into contact with Coccidia and form eggs, it penetrates the protective shell and the cells are seen to be burst, probably mechanically. However, the methylene chloride is preferably employed with biocidic substances dissolved therein. Biocidic substances are understood to mean for example germicides such as phenols, chlorophenols, cresols, quaternary ammonium compounds or other similarly acting substances, as well as insecticides or contact insecticides such as DDT, hexachlorocyclohexane, octochlorodipropyl ether, O,O-dimethyl-s-(1,2-dicarbethoxyethyl)dithiophosphate and similar substances.

The disinfectants according to the invention are preferably in the form of an aqueous emulsion, the water covering preventing evaporation of the low-boiling chlorohydrocarbons before the disinfectant acts on the germs to be destroyed. The concentration of the emulsions is preferably about 5%.

So that the disinfectants form stable emulsions, emulsifiers are preferably added thereto, such as soaps and/or other surface-active substances, for example polyoxyethylene sorbitan oleate, sodium lauryl ether sulphate, triethanolamine palmitin sulphonate and the like. Finally, it has been found advantageous for the disinfectants according to the invention to contain wetting agents. The wetting agents ensure that the aqueous emulsion penetrates deep into the surface to be disinfected, for example wooden floors, perches and dropping boards, the walls and ceilings of the runs, etc., enabling the Coccidia and worm eggs to be better attacked and killed.

It is to be pointed out that the disinfectant according to the invention is to be used only exernally.

Besides the low chlorinated hydrocarbons, especially methylene chloride, an addition of methanol has surprisingly also been found to be advantageous. The cause of the increased efficacy observed is however not yet fully known.

The composition of some disinfectants according to the invention is given in the following examples.

EXAMPLE 1

|   | Percent |
|---|---|
| Methylene chloride | 60.0 |
| Methanol | 12.0 |
| Potassium talloil soap | 15.0 |
| (α+β)-3,5,5-trimethyl-2-cyclohexene-1-one | 1.0 |
| 2,6-dimethyloctene-al-8 | 0.5 |
| Sodium lauryl ether sulphate | 2.0 |
| Polyoxyethylene sorbitan oleate | 2.0 |
| Triethanolamine palmitin sulphonate | 3.0 |
| p-Chloro-m-cresol | 0.6 |
| p-Chloro-m-xylenol | 0.4 |
| Dichloroxylenol | 0.5 |
| Hexachlorocyclohexane | 2.5 |
| Triethanolamine | 0.5 |
| | 100.0 |

EXAMPLE 2

|   | Percent |
|---|---|
| Methylene chloride | 50.0 |
| Trichloroethylene | 10.0 |
| Methanol | 12.0 |
| Triethanolamine | 0.5 |
| (α+β)-3,5,5-trimethyl-2-cyclohexene-1-one | 1.2 |
| 2,6-dimethyloctene-al-8 | 0.5 |
| Monoethanolamine lauryl ether sulphate | 7.5 |
| Mineral spirits | 12.5 |
| p-Chloro-m-cresol | 0.6 |
| p-Chloro-m-xylenol | 0.4 |
| Dichloroxylenol | 0.3 |
| DDT (dichlorodiphenyltrichloroethane) | 3.5 |
| Octachlorodipropylether | 1.0 |
| | 100.0 |

EXAMPLE 3

| | |
|---|---|
| Methylene chloride | 50.0 |
| 1,1,1-trichloroethane | 10.0 |
| Methanol | 13.2 |
| 3,5,5-trimethyl-2-cyclohexene-1-one | 1.0 |
| Triethanolamine | 0.5 |
| Triethanolamine oleate | 1.0 |
| Monoethanolamine lauryl ether sulphate | 5.0 |
| Mineral spirits | 5.0 |
| Potassium talloil soap | 10.0 |
| 2,6-dimethyloctene-al-8 | 0.5 |
| p-Chloro-m-cresol | 0.6 |
| p-Chloro-m-xylenol | 0.4 |
| Dichloroxylenol | 0.3 |
| O,O - dimethyl - s - (1,2 - dicarbethoxyethyl) - dithiophosphate | 2.5 |
| | 100.0 |

EXAMPLE 4

The disinfectants given in Examples 1 to 3 are diluted with water to form 5% emulsions, sprayed and allowed to act for 15 minutes on Coccidia oocysts and worm eggs. At the end of this period, the Coccidia oocysts and worm eggs are destroyed, i.e. there is no sporation as compared with comparative samples.

The Coccidia were obtained from the gut of recently killed hens by salt concentration. The worm eggs were concentrated from droppings and treated in the same manner as the Coccidia.

Besides being effective against Coccidia oocysts and worm eggs, the disinfectant according to the invention is effective against tubercle bacilli, which are protected in the same manner from attack by conventional disinfectants.

What is claimed is:

1. Method of killing organisms selected from the group consisting of Coccidia in oocyst form and Ascaridae worm eggs protected by a lipoid-containing shell, said method comprising contacting said organisms with a biocidally effective amount of methylene chloride.

2. A method according to claim 1 wherein at least one member selected from the group consisting of trichloroethane and trichloroethylene is used in combination with said methylene chloride.

3. A method according to claim 1 wherein at least one member selected from the group consisting of chlorophenol, cresol, DDT, hexachlorocyclohexane, octachlorodipropyl ether and O,O-dimethyl-s-(1,2-dicarbethoxyethyl)-dithiophosphate is used in combination with methylene chloride.

4. A method according to claim 1 wherein said methylene chloride is employed in the form of an aqueous emulsion.

5. A method according to claim 1 wherein methanol is employed in combination with said methylene chloride.

References Cited

UNITED STATES PATENTS

| | | | |
|---|---|---|---|
| 422,544 | 3/1890 | Schmidt | 167—22 |
| 2,852,471 | 2/1955 | Atkins et al. | 252—171 |
| 3,133,857 | 4/1964 | Swezey | 167—39 |
| 3,183,147 | 4/1965 | Homeyer et al. | 167—30 |

OTHER REFERENCES

Journal of Pharmacy and Pharmacology, vol. 7, 1955, pp. 416–420.

Surface Active Agents and Detergents, vol. II, Schwartz-Perry-Berch, Interscience Pubs., Inc., New York (1958).

Pesticide Index, Frear Coll. Science Pubs., P.O. Box 798, State College, Pa., 1963.

The Merck Index, Merck & Co., Inc., Rahway, N.J., U.S.A., 1960.

ALBERT T. MEYERS, Primary Examiner

FREDERICK E. WADDELL, Assistant Examiner

U.S. Cl. X.R.

424—342, 346, 347, 350, 351, 354